United States Patent [19]
Homm et al.

[11] Patent Number: 5,666,820
[45] Date of Patent: Sep. 16, 1997

[54] CEILING COOLING

[75] Inventors: Karl Georg Homm, Marl/Polsum; Michael Wittkaemper, Bochum, both of Germany

[73] Assignee: Hewing GmbH, Ochtrup, Germany

[21] Appl. No.: 454,162

[22] PCT Filed: Dec. 8, 1993

[86] PCT No.: PCT/EP93/03457

§ 371 Date: Jun. 21, 1995

§ 102(e) Date: Jun. 21, 1995

[87] PCT Pub. No.: WO94/14010

PCT Pub. Date: Jun. 23, 1994

[30] Foreign Application Priority Data

Dec. 10, 1992 [DE] Germany .................. 9216792 U
Oct. 8, 1993 [DE] Germany .................. 9315216 U

[51] Int. Cl.⁶ .......................... F24D 3/16; F16L 3/24
[52] U.S. Cl. .................. 62/259.1; 52/220.6; 248/58; 248/59
[58] Field of Search ...................... 62/259.1, 331, 62/298, 434, DIG. 1, DIG. 16; 52/39, 220.6, 506.02, 506.06, 506.08; 138/107; 248/59, 58

[56] References Cited

U.S. PATENT DOCUMENTS

| | | | |
|---|---|---|---|
| 1,144,593 | 6/1915 | Heiser | 248/59 |
| 2,729,431 | 1/1956 | Little | 52/220.6 |
| 3,843,080 | 10/1974 | Imai et al. | 248/58 |
| 4,671,033 | 6/1987 | Smith | 52/220.6 |
| 5,495,724 | 3/1996 | Koster | 62/259.1 |

*Primary Examiner*—William Doerrler
*Attorney, Agent, or Firm*—Jordan and Hamburg

[57] ABSTRACT

A cooling ceiling for interior air conditioning having a pipe system through which cooling air flows is arranged at least in part between the ceiling (1; 101) of a building and corresponding ceiling elements (3; 103) and is secured in the mounted position by a holding member (5; 105) which carries the ceiling elements (3; 103). In the mounted position, the cooling pipe (4; 104) lies against the ceiling elements (3; 103). A joint (10, 10', 10"; 111, 111', 111") arranged between the holding member (5; 105) and the corresponding area of the cooling pipe (4; 104) has a depression (9, 9'; 109) for receiving the cooling pipe (4; 104) and supports said cooling pipe on the holding member (5; 105) in a vertically adjustable manner.

38 Claims, 9 Drawing Sheets

Fig. 19

# CEILING COOLING

BACKGROUND OF THE INVENTION

The invention relates to a cooling ceiling for air conditioning a room with a system of pipes through which cooling water flows.

For known cooling ceilings (DE 39 21 710 A1), the pipes forming the heat exchanger element are inserted into a profiled rail, which, at its side directed to the bare ceiling, is suspended from the bare ceiling over a bearing rail, a longitudinal beam and a suspension strut and is connected at its underside over magnets with panels constructed as ceiling lining elements. This construction is expensive to build and there is little flexibility when it is used under tight space conditions.

SUMMARY OF THE INVENTION

It is an object of the invention to provide a cooling ceiling for room air conditioning of the cooling pipes which are placed stress-free on the ceiling elements and, in the event of different ceiling distances, makes it possible to compensate for permissible variations with little technical effort.

The present invention provides a cooling ceiling with a connecting element, for stress-free support of cooling pipes in an installed position and an installation of ceiling elements with an inner side having cooling water pipe sections for the heat exchange directed to the bare sealing, and which are adapted with little effort to different installation conditions. At the same time, a substructure, which is formed between the bare ceiling and the ceiling element, such as the holding element that is supported in the installed position at a beam, can be combined as a standard beam element with the ceiling element forming a standard panel part in such a manner, that adaptation even to tight space relationships takes place in each case with little effort over the connecting element. The ceiling element, which lies against the cooling pipe in the installed position utilizing vertical movement clearance, can be fixed at different installation heights.

With the connecting element, a component is provided for new constructions as well as for reconstructions of cooling ceilings. This component can be installed with little effort and without additional accessories. Furthermore, this component makes simple dismantling in the region of the cooling ceiling possible, for example, for repairs.

The development of the cooling ceiling with a molded plastic part as a connecting element, which preferably has the basic shape of a parallelepiped, provides a solid, non-damaging connection between the cooling pipes or cooling regions and the associated holding elements, which can easily be manufactured. In a preferred development with inwardly directed hook parts, the connecting elements, which are in two dimensional engagement with the cooling pipes and the holding elements, can be connected only in a position deviated from its installed position with a holding element and detached from this again, so that, after the connection with a cooling pipe is established, a connection with the holding elements is assured, which can be adjusted in height, but not, however, readily be undone.

Further details and advantages of the invention arise out of the following specification and the drawing, which illustrates several embodiments of an inventive cooling ceiling.

BRIEF DESCRIPTION OF THE DRAWINGS

FIG. 11 shows a diagrammatic side view of a cooling pipe section in the installed position with two connecting elements and several pipe-guiding segments lying these between;

FIG. 13A shows a perspective view of a two-part connecting element with plugin connectors in the region of the pipe-supporting part for the mutual connection in the direction at right angles to that in which the pipes are laid;

DESCRIPTION OF THE PREFERRED EMBODIMENTS

Figure 1:
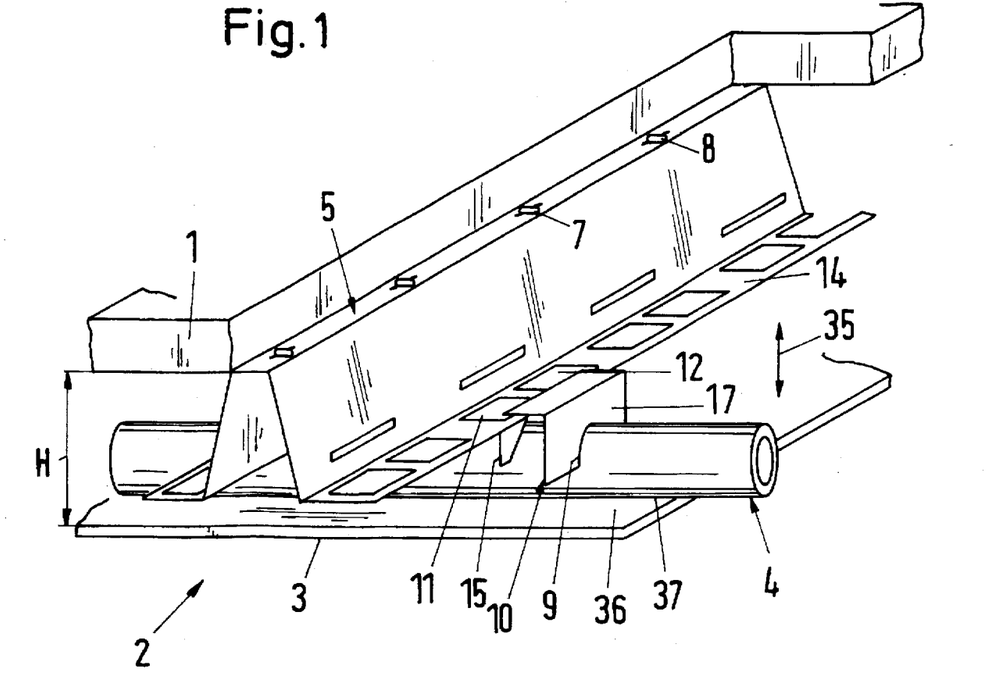
FIG. 1 shows a partial sectional view of an inventive cooling ceiling with a holding element and a connecting element according to a first embodiment of the invention.

In FIG. 1, a cooling ceiling 2 is shown, which is suspended from a bare ceiling 1 shown in perspective view and ceiling elements 3 which are formed from panels, optically hide the cooling pipe system indicated by a cooling pipe 4. The ceiling element 3 and the cooling pipe 4 are fixed in an installed position by a holding element 5 suspended from the bare ceiling 1. Connecting means (not shown) pass through the fastening openings 7, 8 of the holding element 5. By these connecting means, the holding element 5 can lie against the bare ceiling 1 by means of a detachable connection.

Figure 3:
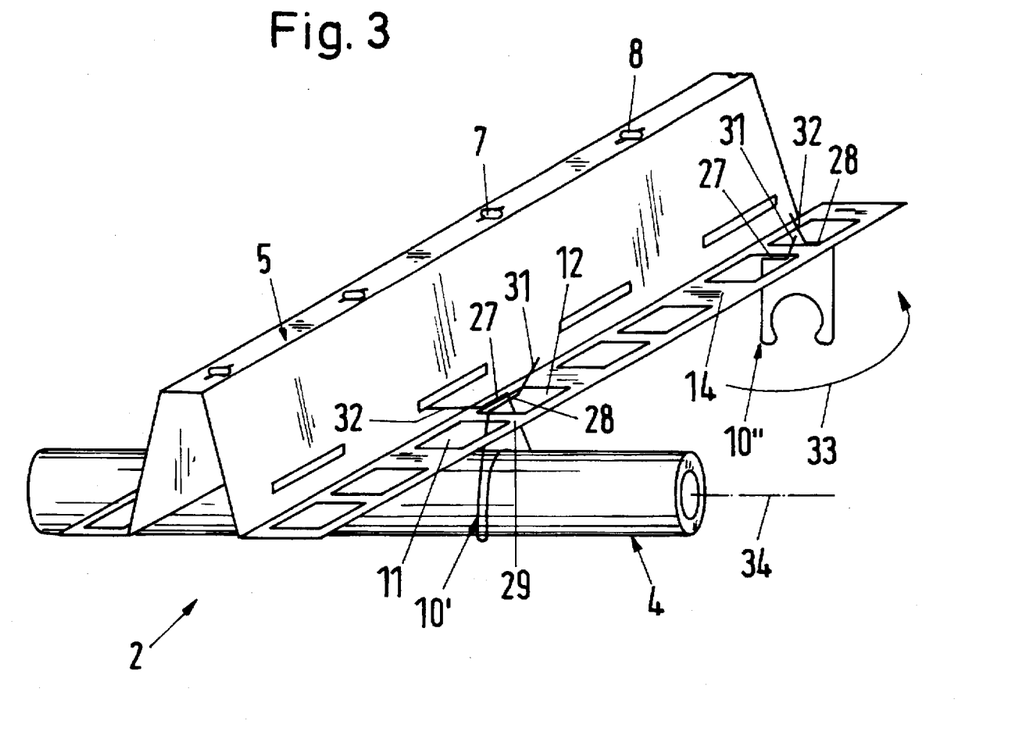
FIG. 3 shows a partial sectional view of the cooling ceiling with a second embodiment of a connecting element of the invention.

In both embodiments of the cooling ceiling 2 of FIGS. 1 and 3, a connecting element 10, 10', which accommodates the cooling pipe 4 in a shaped recess 9, 9', is disposed between the holding element 5 and the respectively assigned region of the cooling pipe 4. The connecting element 10 of FIG. 1 is inserted through two accommodating openings 11, 12 of a holding leg 14 of the holding element 5, the accommodating openings 11, 12 being disposed in pairs.

On the side opposite from the shaped recess 9, the connecting element 10 is provided with two supporting hooks 15, 16 (FIG. 2), which, in the installed position, pass through the accommodating openings 11, 12 at the holding element 5.

Figure 2:
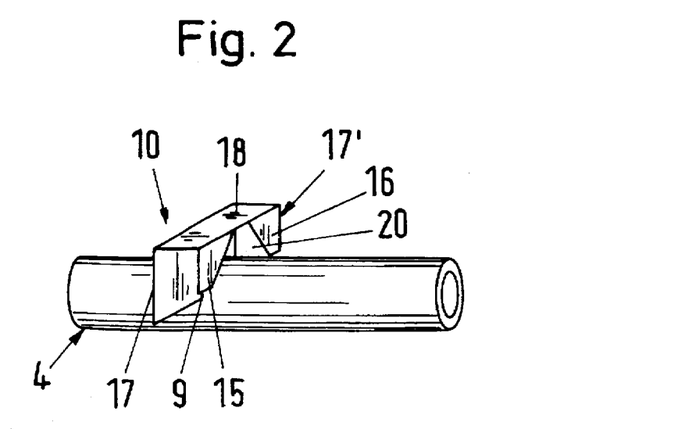
FIG. 2 shows a partial sectional view of the connecting element of FIG. 1 into which the cooling pipe is snapped.

The separate representation of FIG. 2 illustrates the construction of the connecting element 10 as a one-piece shaped part, having a U-shaped cross section and which is made of sheet metal, plastic or the like. One leg 17 of the shaped part has a shaped recess 9 for the cooling pipe 4 and the other leg 17' of the shaped part is provided with the supporting hooks 15, 16. The base leg 18, which connects legs 17 and 17' forms a flat portion of the connecting element 10, which can be placed onto the holding leg 14 of the holding element 5. In an appropriate embodiment, the supporting hooks 15, 16, provided in the profiled leg 17', are formed so as to define a central shaped recess 20 of the profiled leg 17'.

Figure 4:
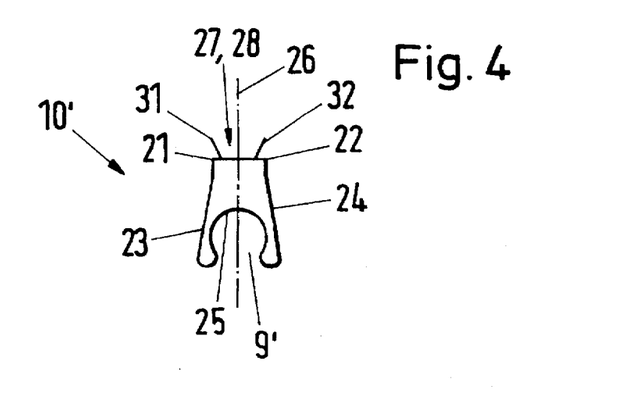
FIG. 4 shows an enlarged elevational view of the connecting element of FIG. 3.

In FIGS. 3 and 4, a second embodiment of the inventive connecting element 10', 10" is shown, which is formed from a one-piece length of wire that is bent into an appropriate shape. This length of wire has two holding legs 23, 24, which are provided with supporting hooks 21, 22 that are introduced into the accommodating openings 11, 12 of the holding element 5 and which are connected in one piece over a wire arch 25 forming the shaped recess 9' for the cooling pipe 4.

The two holding legs 23, 24, starting out from the wire arch 25, run symmetrically with respect to a central plane 26. The supporting hooks 21, 22 at the ends cross one another in a pliers fashion and, in so doing, form supporting leg regions 27, 28, which are supported on a cross member 29 between the two accommodating openings 11, 12 (FIG. 3). The two supporting leg regions 27, 28 are at the same height above the shaped recess 9' and have a length matched to the supporting cross member 29 of the holding part 5.

In an advantageous development, the two supporting hooks 21, 22 of the connecting element 10' are extended in the respective supporting leg region 27, 28 in one piece with guiding parts 31, 32 extending upwards, and jointly form an installation accessory.

In FIG. 3, the swiveling motion indicated by an arrow 33 illustrates that the connecting element 10' or 10" can be installed or disassembled easily. In the installed position (connecting element 10'), the two holding legs 23, 24 are aligned in a holding plane, which corresponds to the central plane 26, and are perpendicular to the pipe-installing axis 34 and from which they can be swiveled elastically during a dismantling procedure and separated from the holding element 5 in a swiveling manner corresponding to the connecting element 10" in FIG. 3. With a reverse course of motions, the connecting elements 10' and 10" can be locked into the respective holding element 5 without additional accessories and can be fixed lastingly in the installed vertically adjustably position in such a manner, so that the previously described disassembly is possible with little effort and without damage.

In the embodiment of the connecting element 10 of FIGS. 1 and 2, this molded sheet-metal part is also connected lastingly with the holding element 5. This connection is attained by means of the cooling pipe 4 engaging the shaped recess 9. At the same time, the cooling pipe 4 is held vertically adjustably in its installed position.

The direction in which the ceiling element 3 is installed, is indicated by an arrow 35 in FIG. 1. At the same time, the upper surface 36 of the ceiling element 3 comes to lie against the lower surface 37 of the cooling pipe 4. Moreover, by means of the connecting element 10, 10', 10" to the ceiling element 3, which lies in the installed position against the cooling pipe 4, advantageously achieve vertical motion clearance (arrow direction 35), and can therefore be fixed at different installed heights, which can be selected over an appropriate length of the connecting elements 10, 10' or of the profiled leg 17 (FIG. 1) and of the holding leg 23, 24 (FIG. 3), which determine the installed position of the cooling pipe 4 in such a manner that, when a standard holding element 5 is used advantageously, different suspensions H of the cooling ceiling 2 are formed.

Figure 5:
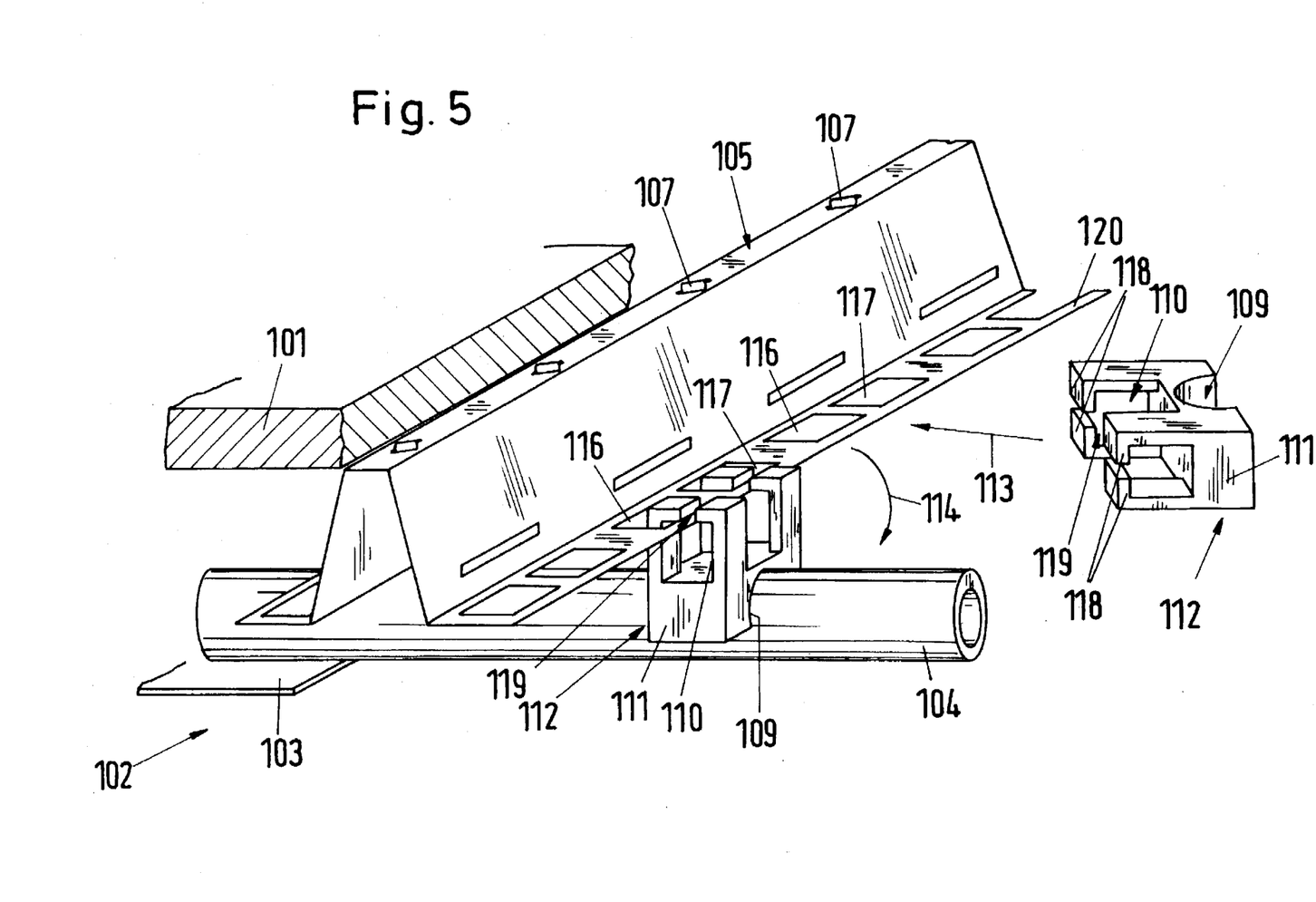
FIG. 5 shows a partial sectional view, partly blown apart, of an inventive cooling ceiling with a third embodiment of a connecting element of the invention.

FIG. 5 is a perspective view of a bare ceiling 101, from which a cooling ceiling 102 is suspended. The ceiling elements 103 of the cooling ceiling 102 are formed from panels, which optically cover the system of cooling pipes indicated by a cooling pipe 104. The ceiling element 103 and the cooling pipe 104 are fixed in the installed position at the bare ceiling 101 by a holding element 105 to the ceiling 101. Fastening means, not shown, secure the holding element 105 against the bare ceiling 101 by way of a detachable connection through fastening openings 107 of the holding element 105.

The representation of FIG. 5 illustrates a third embodiment of the holding system, namely a connecting element 112, on the one hand, accommodating the cooling pipe 104 in a first recess and, on the other hand, held with a second shaped recess 110 at the holding element 105. Connecting element 112 is constructed as a cuboid connecting block 111, provided between the holding element 105 and the respectively assigned region of the cooling pipe 104.

The different installation phases of the connecting block 111 (indicated with directional arrows 113, 114), indicate in FIG. 5 that the connecting block 111 is provided in the region of the second shaped recess 110 with supporting hooks 118, which in the installed position engage the respective accommodating openings 116, 117 of the holding element 105 and between which an installation slot 119 extends. The width of this installation slot 119 is dimensioned so that the connecting block 111 can be placed lastingly and vertically adjustably in the installed position on an edge cross member 120 of the holding element 105.

The separate representations in FIGS. 6 to 9 illustrate a second embodiment of the connecting block 111', which is constructed as a two-part component, having a pipe-supporting part both a first shaped recess 109 and suspension part 122 both a second shaped recess 110. In an appropriate embodiment, the pipe-supporting part 121 and the suspension part 122 are provided in each case with pairing parts 123, 124, which can be connected over an easily installable plug and socket connection.

Figure 6:
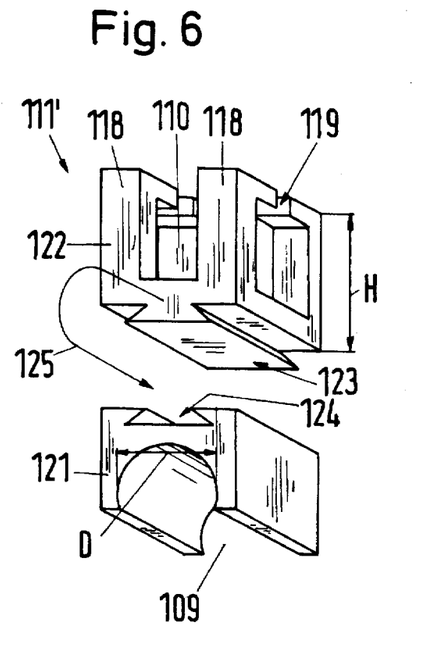
FIG. 6 shows a perspective, blown apart view of a two-part connecting element according to another embodiment of the present invention that can be used in place of the connecting element of FIG. 5.
Figure 7:
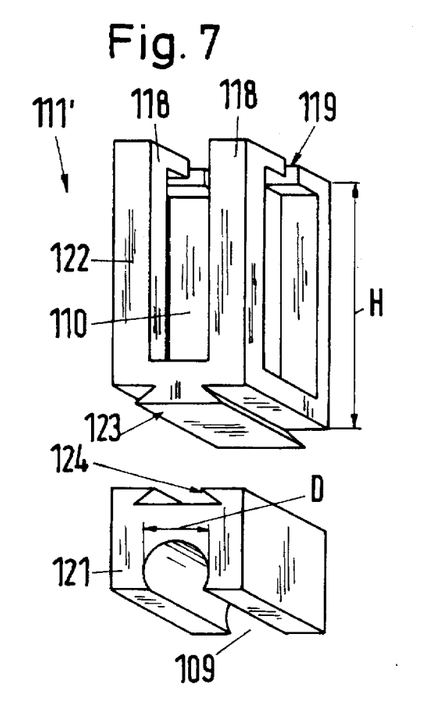
FIG. 7 shows a perspective, blown apart view of a two-part connecting element according to another embodiment of the present invention that can be used in place of the connecting element of FIG. 5.

In FIGS. 6 and 7, the pairing parts 123, 124 are constructed between suspension part 122 and pipe-supporting 121 in each case as dovetailed profiled shapes, which can be pushed into one another, so that the two components, for example after a positioning of the suspension part 122 in the installation position (as in FIG. 5), can be connected over a plug and socket connection (arrow 125 in FIG. 6) with little effort.

Figure 8:
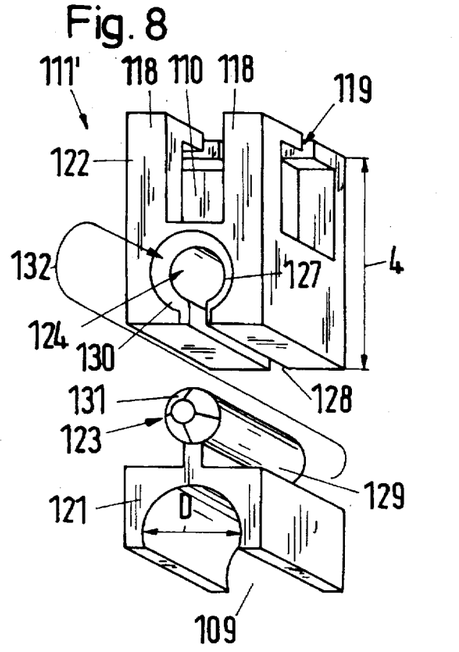
FIG. 8 shows a perspective, blown apart view of a two-part connecting element according to another embodiment of the present invention that can be used in place of the connecting element of FIG. 5.

In the embodiment of FIG. 8, the pairing parts 123, 124 are constructed, on the one hand, as a borehole 127 with a guiding slot 128, the borehole being horizontal in the connection position, and, on the other hand, as a cylindrical shoulder 129. The installing motion corresponding to the direction of the arrow 132 can be facilitated by appropriated bevels 130, 131 in the region of the two pairing parts 123, 124.

Figure 9:
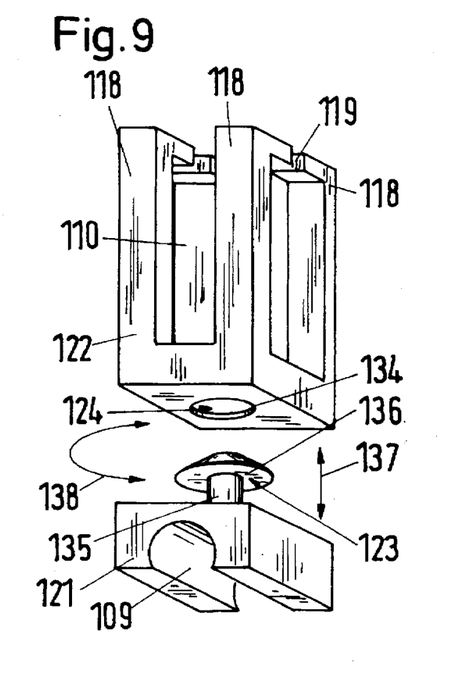
FIG. 9 shows a perspective, blown apart view of a two-part connecting element according to another embodiment of the present invention that can be used in place of the connecting element of FIG. 5.

In the embodiment of FIG. 9, on the one hand a borehole 134, which is vertical in the connection position, and, on the other hand, a locking projection 135 with an undercut 136 are provided as pairing parts 123, 124, so that the pipe-supporting part 121 and the suspension part 122 are installed in the form of a clip connection (arrow 137) and, after that, the pipe-supporting part 121 can be tilted in different holding positions along arrow 138.

In the embodiments of FIGS. 6 to 9, different size dimensions H of the suspension parts 122 and the construction of the pipe-supporting parts 121 with different diameters D in the region of the first shaped recess 109 illustrate a variable conformation of the connecting blocks 111, 111', which can be adapted with little effort to the respective installation conditions of the cooling ceiling 102, so that it is possible to react to different, customer-specific requirements. At the same time, the cuboid connecting blocks 111, 111' can be transported in a space-saving stacked position to the respective site of the installation and, by way of the previously described pairing parts 123, 124, be installed with little effort and without additional accessories.

Figure 10:
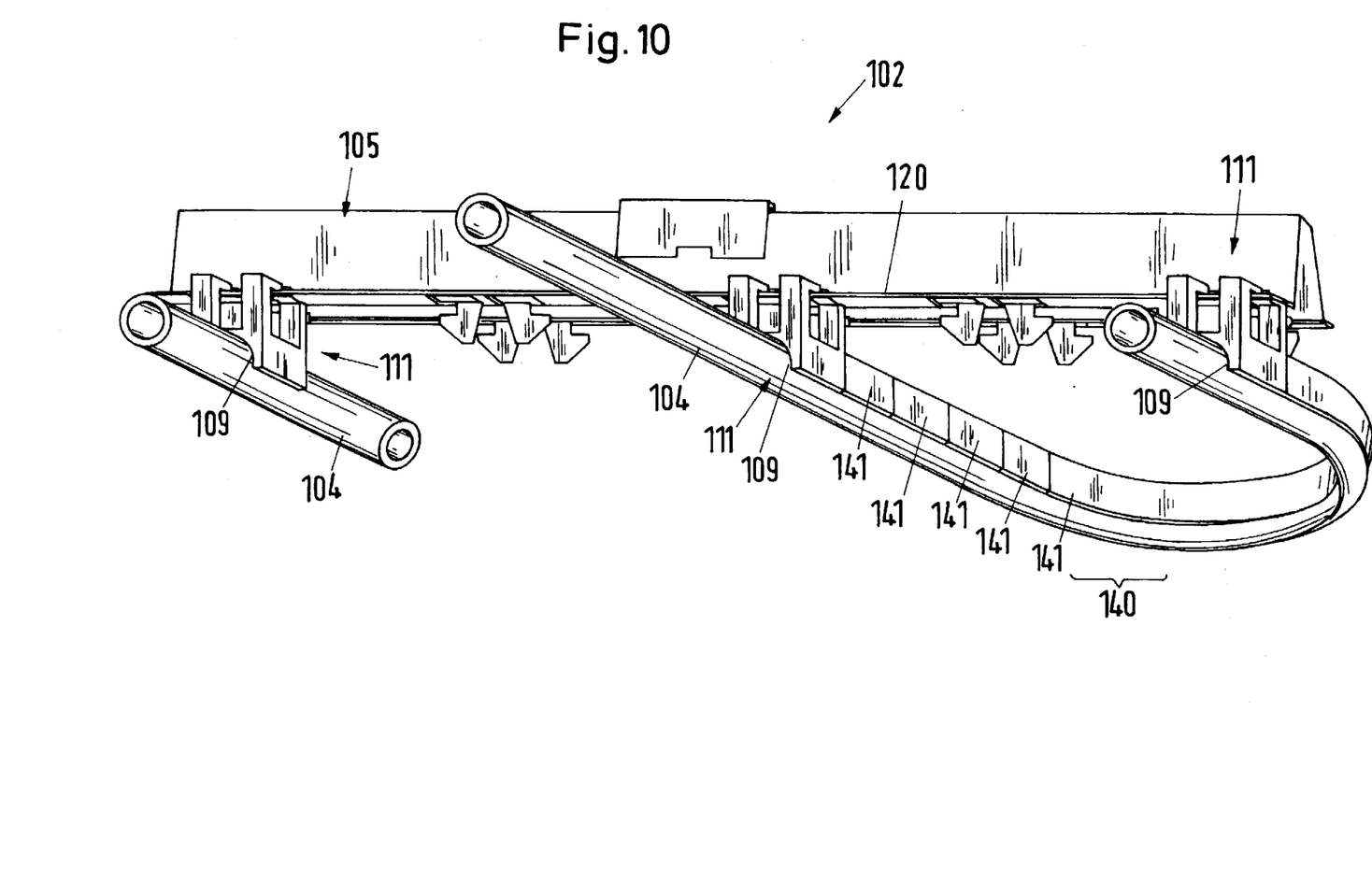
FIG. 10 shows a partial sectional view of a cooling ceiling, similar to that of FIG. 5, illustrating a cooling pipe in the region of an installation arch.

FIG. 10 is a perspective view of a partial region of the cooling ceiling 102, the cooling pipe 104 of which, held in the first shaped recess 109 of the connecting block 111 or the pipe-supporting part (not shown) in the installed least in, is provided at least in the region of a respective installation arch 140 with several pipe-guiding segments 141.

Figure 11:
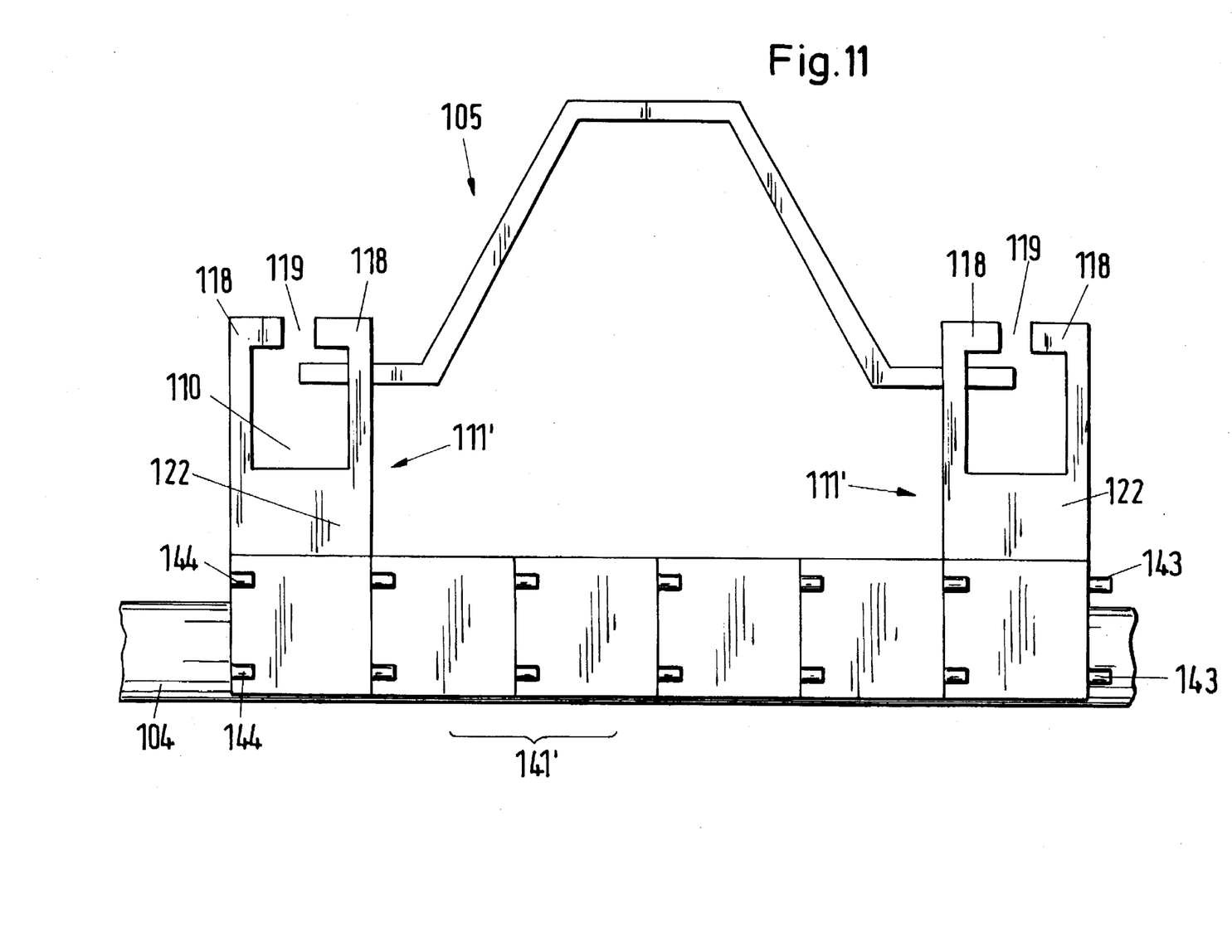
Figure 12A:
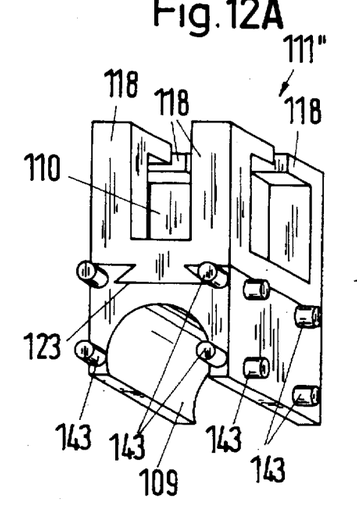
FIG. 12B shows a perspective view of two of the two-part connecting elements of FIG. 12A assembled together.
Figure 12B:
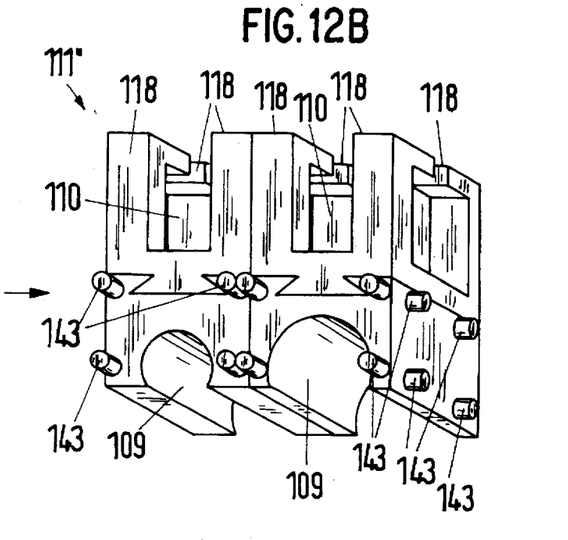
Figure 13:
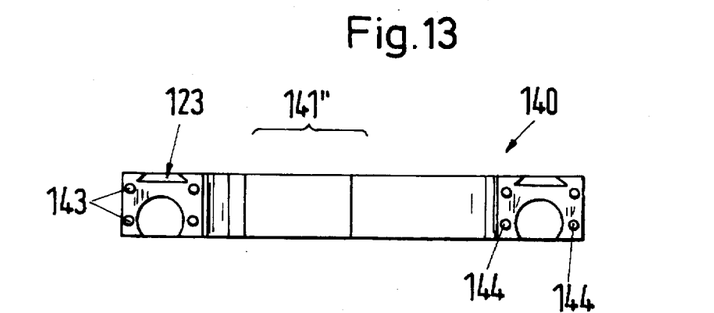
FIG. 13 shows an end elevational view of a pipe-guiding segment according to the present invention.
Figure 14:
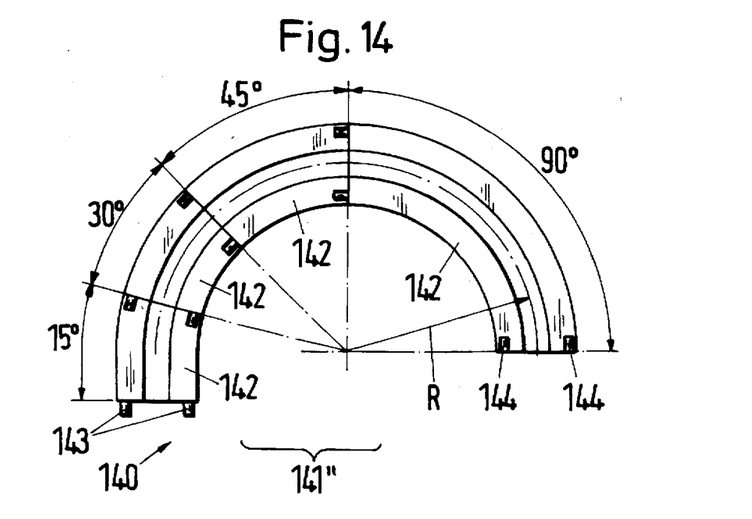
FIG. 14 shows an elevational view of the pipe-guiding segment of FIG. 13.
Figure 15:
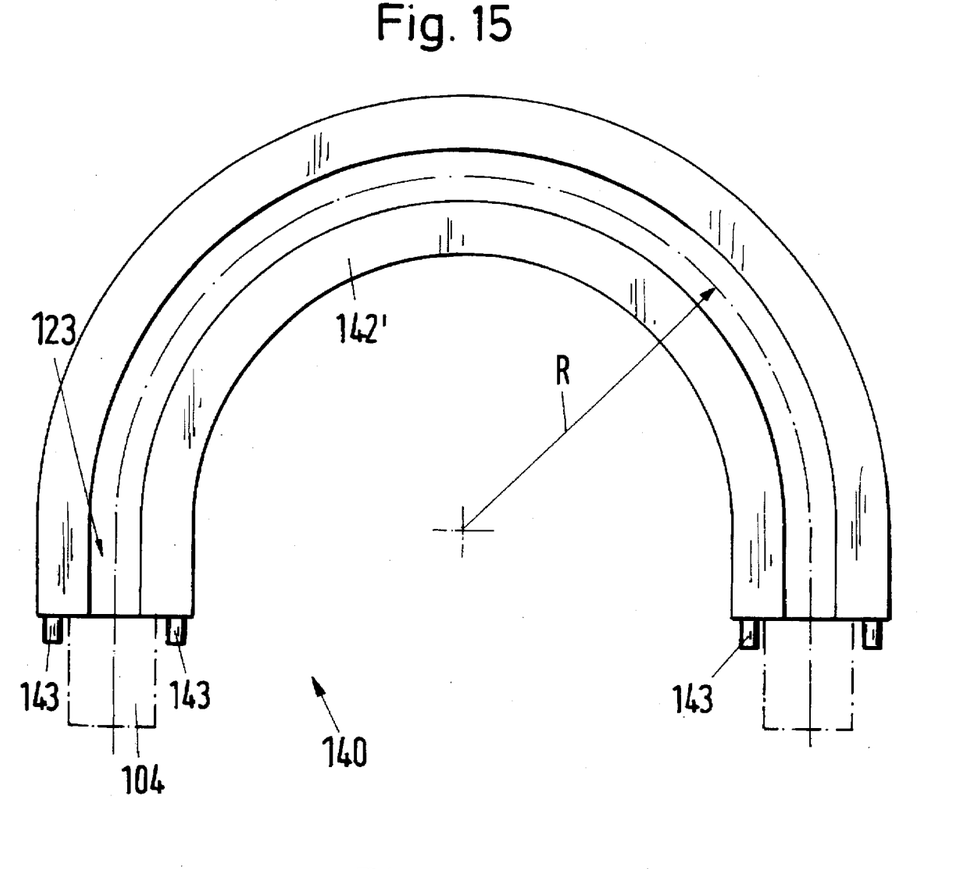
FIG. 15 shows an elevational view of a unitary pipe-guiding segment according to another embodiment of the present invention.
Figure 16:
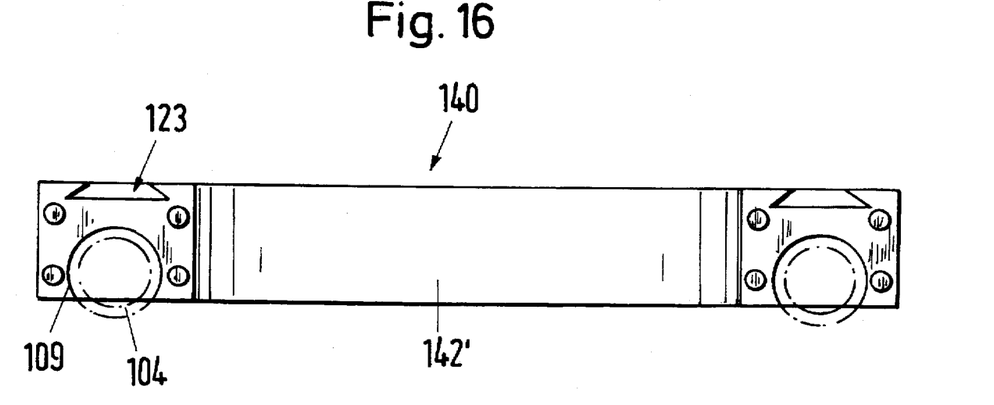
FIG. 16 is a bottom plan view of the pipe-guiding segment of FIG. 15.

The diagrammatic side view of FIG. 11, in conjunction with FIG. 10, illustrates that the pipe-guiding segment 141' can have, on the one hand, the pairing part 123 that can be connected over the plug and socket connection with the suspension part 122 and, on the other hand the first shaped recess 109 accommodating the cooling pipe 104. An alternative use and combination of the components in the form of a kit is thus possible.

The different embodiments of the pipe-guiding segment 141" of FIGS. 12 to 16 illustrate that the pipe-guiding system can be constructed as an arch-shaped part 142, which is adapted to the radius R of the respective installation arch 140 at least in regions and forms different segments (such as 15°, 30°, 45°, 90°). A one-piece arch-shaped part 142' (FIG. 15) or a component composed of several segments (FIG. 14) can be provided for stabilizing the cooling pipe 104 in the whole region of the installation arch 140.

In an appropriate embodiment, the respective pipe-guiding segment 141, 141', 141" or the arch-shaped part 142, 142' is provided with plug and socket connectors, which in each case run in the direction in which the pipes are laid and are constructed, on the one hand, as pin plug-in projections 143 and, on the other, as accommodating openings 144, so that any supporting contours can be formed therewith. With such pin connectors 143 disposed all around (FIG. 12), stabilization of the installed cooling pipe 104 can be achieved longitudinally as well as transversely to the laying direction.

Figure 17:
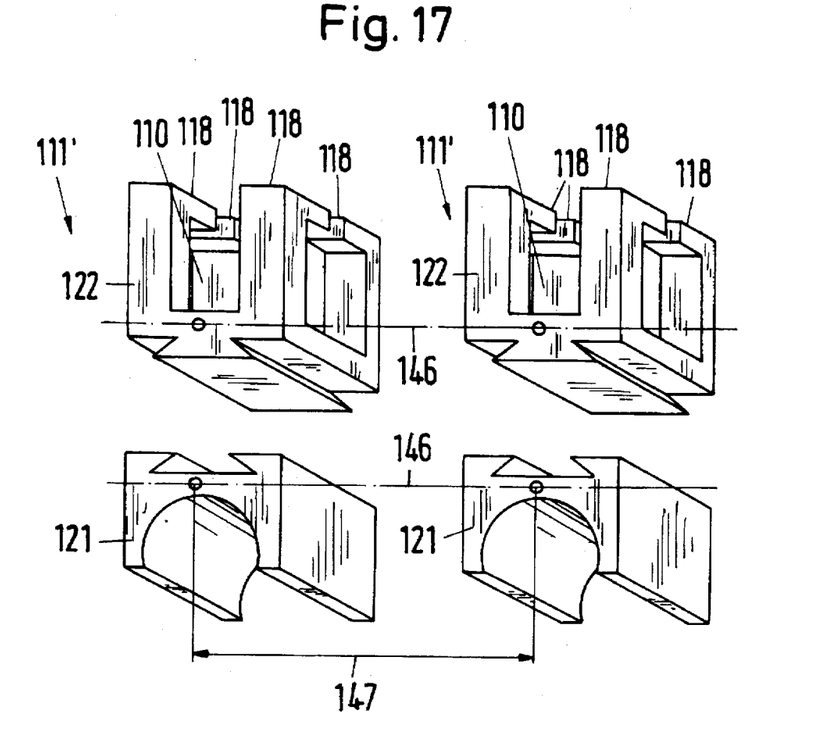
FIG. 17 shows a perspective, blown apart view of pipe-supporting parts and suspension parts put in a row at a strip-shaped connecting element.

In FIG. 17, an accessory for installing the inventive connecting block 111' in a two-part construction (as in FIG. 6) is shown. The pipe-supporting part 121 and the suspension part 122 are put in a row at a strip-shaped connecting means 146 in such a manner, that the separate parts offer a defined installation distance 147 and rapid installation without further accessories is possible in the predetermined position.

Figure 18:
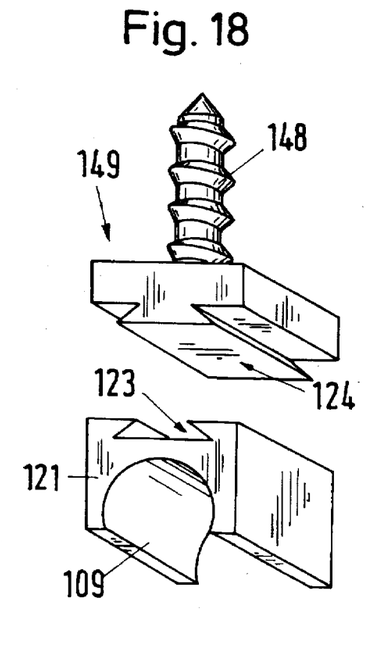
FIGS. 18 shows a perspective, blown apart view of a different suspension part for fastening pipe-supporting pipes directly to ceiling surfaces, and or wall surfaces.
Figure 19:
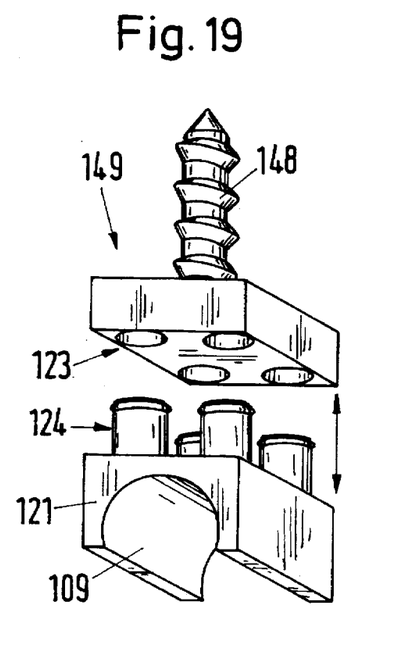
FIG. 19 shows a perspective, blown apart view of a different suspension part for fastening pipe-supporting pipes directly to ceiling surfaces or wall surfaces.

In FIGS. 18 and 19, two further embodiments for an additional use of the previously described suspension parts 122 are shown. These suspension parts are combined in such a manner with a supporting element 149, which can be fixed directly to a ceiling surface or a wall surface (not shown) and is preferably provided with a screw part 148, that the cooling pipe (not shown) in the shaped recess 109 can be connected with little effort over the pairing parts 123, 124, which form an additional holding device.

We claim:

1. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building; and a plurality of connecting elements each having a bottom side defining a first shaped recess which accommodates a respectively assigned region of one of said cooling pipes therein while leaving a bottom surface of said one of said cooling pipes exposed from beneath, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position.

2. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipes and being supported in a vertically adjustable manner relative to the holding element such that the bottom surfaces of said cooling pipes lie against the ceiling elements when in an installed position;

the holding element including a plurality of openings therein; and each of said connecting elements including a side opposite from the first shaped recess thereof, said side having at least one supporting hook which, in the installed position, reaches through at least one of said openings in the holding element.

3. The cooling ceiling pipe support apparatus according to claim 2, wherein each of said connecting elements is formed as a one-piece molded part having a U-shaped cross section including:

a first side leg including the shaped recess for receiving one of said cooling pipes;

a second side leg spaced from said first side leg and including said at least one supporting hook; and a base leg interconnecting said first and second legs and which can be supported on the holding element.

4. The cooling ceiling pipe support apparatus according to claim 3, wherein said openings of said holding element are arranged in pairs, and said second side leg includes two supporting hooks which can be introduced into one of said pair of openings in the holding element, said two supporting hooks being provided on opposite sides of said second side leg so as to define a central shaped recess of said second side leg.

5. The cooling ceiling pipe support apparatus according to claim 2, wherein each of said connecting elements is formed from a single piece of wire, and includes:

at least one holding leg including the at least one supporting hook, which can be introduced into one of said openings of the holding element; and a wire arch defining the first shaped recess for receiving one of said cooling pipes.

6. The cooling ceiling pipe support apparatus according to claim 5, wherein the wire connecting element includes two of said holding legs, each of said holding legs starting out from the wire arch and each of said holding legs including one of said supporting hooks, said supporting hooks of said two holding legs being symmetrical to a center plane and crossing each other in a pliers fashion.

7. The cooling ceiling pipe support apparatus according to claim 6, wherein:

said holding element includes cross members which separate adjacent ones of said openings of said holding element; and each of said supporting hooks has a supporting leg region which is supported on one of said cross members.

8. The cooling ceiling pipe support apparatus according to claim 7, wherein each of said supporting leg regions is at the same height above the respective shaped recess as the other supporting leg region and has a length corresponding to a width of said one of said cross members of the holding element.

9. The cooling ceiling pipe support apparatus according to one of the claim 6, wherein each of the two supporting hooks has an upwardly extending guiding part which together, jointly form an installation accessory.

10. The cooling ceiling pipe support apparatus according to claim 6, wherein the two holding legs extend, in an installed position, in a holding plane perpendicular to an axis of a respective one of said cooling pipes and can be elastically swiveled for installation purposes.

11. The cooling ceiling pipe support apparatus according to claim 1, wherein each of said connecting elements includes an injection molded, plastic part.

12. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position; and each of said connecting elements having a parallelepiped shape and being formed by injection molding.

13. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position; and each of said connecting elements including an upper region, in an installed position, which can be connected with the holding element, said upper region including:

two pairs of hooks for connection with the holding element;

an installation slot defined between upper ends of said hooks; and a second shaped recess provided between said two pairs of hooks, said second shaped recess being accessible from outside of said connecting element between said hooks and being accessible from an upper side of the connecting element through said installation slot.

14. The cooling ceiling pipe support apparatus according to claim 13, wherein each of said pairs of hooks includes two inverted L-shaped members facing each other with a gap therebetween, and each of said pairs of hooks being provided on opposite sides of said connecting element.

15. The cooling ceiling pipe support apparatus according to claim 13, wherein each of said connecting elements is comprised of two components which can be assembled together, one of said components being a pipe-supporting part having the first shaped recess and the other component being a suspension part having the second shaped recess.

16. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position; and each of said connecting elements being comprised of two components which can be assembled together, one of said components being a pipe-supporting part having the first shaped recess and the other component being a suspension part having means for connecting the connecting element to the holding element, the pipe-supporting part and the suspension part including mating elements for connecting the pipe-supporting part and the suspension part together.

17. The cooling ceiling pipe support apparatus according to claim 16, wherein said mating elements include plug and socket means for connecting the pipe-supporting part and the suspension part together.

18. The cooling ceiling pipe support apparatus according to claim 17, wherein the plug and socket means include a groove and tenon connection between the suspension part and the pipe-supporting part, with said groove being provided in one of said pipe-supporting part and suspension part and said tenon being provided in the other of said pipe-supporting part and suspension part.

19. The cooling ceiling pipe support apparatus according to claim 18, wherein the groove and tenon connection includes a dove-tailed member in one of said pipe-supporting part and suspension part and a corresponding dove-tailed groove in the other of said pipe-supporting part and suspension part.

20. The cooling ceiling pipe support apparatus according to claim 18, wherein the groove and tenon connection includes a cylindrical member in one of said pipe-supporting part and suspension part and a corresponding cylindrical groove in the other of said pipe-supporting part and suspension part.

21. The cooling ceiling pipe support apparatus according to claim 20 wherein the first shaped recess extends along an axis, and said cylindrical member has a central axis parallel to said axis of said first shaped recess.

22. The cooling ceiling pipe support apparatus according to claim 17, wherein the plug and socket means includes:
a vertically oriented borehole in a bottom of the suspension part; and
a push-button locking projection on the pipe-supporting part for engagement with said borehole.

23. The cooling ceiling pipe support apparatus according to claim 22, wherein said push-button locking projection includes a vertically oriented shaft extending from an upper surface of said pipe-supporting part and a conical head having an outer diameter larger than a diameter of said shaft and is connected to a free end of said shaft.

24. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:
a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position; and pipe-guiding segments which can be connected with the cooling pipe between said connecting elements.

25. The cooling ceiling pipe support apparatus according to claim 24, wherein the pipe-guiding segments are connectable with at least one of:
another pipe-guiding segment; and
one of said connecting elements.

26. The cooling ceiling pipe support apparatus according to claim 24, wherein the pipe-guiding segments have second shaped recesses corresponding to the first shaped recesses of the connecting elements for lockingly receiving the cooling pipe therein, the second shaped recesses of said pipe-guiding segments having a longitudinal center line which extends linearly.

27. The cooling ceiling pipe support apparatus according to claim 26, wherein lengths of some of said pipe-guiding segments are different from lengths of others of said pipe-guiding segments along said longitudinal center lines.

28. The cooling ceiling pipe support apparatus according to claim 24, wherein the pipe-guiding segments have second shaped recesses corresponding to the first shaped recesses of the connecting elements for lockingly receiving the cooling pipe therein, the second shaped recesses of said pipe-guiding segments having a longitudinal center line which extends in a curved manner.

29. The cooling ceiling pipe support apparatus according to claim 28, wherein curvatures of some of said pipe-guiding segments are different from curvatures of others of said pipe-guiding segments along said longitudinal center lines.

30. The cooling ceiling pipe support apparatus according to claim 28, wherein lengths of some of said pipe-guiding segments are different from lengths of others of said pipe-guiding segments along said longitudinal center lines.

31. The cooling ceiling pipe support apparatus according to claim 24, wherein the connecting elements and the pipe-guiding segments include mating elements for connecting the pipe-guiding segments and connecting elements together.

32. The cooling ceiling pipe support apparatus according to claim 24, wherein the pipe-guiding segments are provided alternately with clamping pegs and clamping openings, at least on front faces thereof extending transversely to a direction in which the cooling pipes are laid, such that said clamping pegs of one pipe-guiding segment can engage within said clamping openings of an adjacent pipe-guiding segment.

33. The cooling ceiling pipe support apparatus according to claim 24, wherein the connecting elements are provided at least at front faces thereof, alternately with clamping means of connection extending transversely to a direction in which the cooling pipes are laid, for connection with the pipe-guiding segments.

34. A cooling ceiling pipe support apparatus for air conditioning a room with a system of cooling pipes through which cooling water flows, the cooling ceiling pipe support apparatus supporting said cooling pipes between a ceiling of a building and ceiling elements spaced below the ceiling of the building, the cooling ceiling pipe support apparatus comprising:

a holding element connectable to the ceiling of the building;

a plurality of connecting elements each having a bottom side defining a first shaped recess which accommodates a respectively assigned region of one of said cooling pipes therein, each of said connecting elements being positioned between the holding element and the respectively assigned region of the cooling pipe and being supported in a vertically adjustable manner relative to the holding element such that the bottom surfaces of said cooling pipes lie against the ceiling elements when in an installed position; and a flexible connecting element of a defined installation distance, said flexible connecting element extending in a direction in which the cooling pipes are laid and said connecting elements being mounted thereto.

35. The cooling ceiling pipe support apparatus according to claim 1, further comprising an additional supporting element, said additional supporting element including:

a pipe-supporting part with a shaped recess which accommodates a respectively assigned region of one of said cooling pipe therein;

a suspension part which can be fixed directly to a ceiling or wall surface; and means for coupling together said pipe-supporting part and said suspension part.

36. The cooling ceiling pipe support apparatus according to claim 35, wherein said suspension part includes a screw thread part for fixing said suspension part directly to the ceiling or wall surface.

37. The cooling ceiling pipe support apparatus according to claim 35, wherein said suspension part includes a dowel part for fixing said suspension part directly to the ceiling or wall surface.

38. A cooling ceiling for air conditioning a room, comprising:

ceiling elements spaced below a ceiling of a building;

a system of cooling pipes through which cooling water flows positioned between the ceiling of the building and the ceiling elements and lying against the ceiling elements;

a holding element connectable to the ceiling of the building for supporting said system of cooling pipes from the ceiling of the building; and a plurality of connecting elements, each of said connecting elements having a shaped recess which accommodates a respectively assigned region of one of said cooling pipes therein while leaving a bottom surface of said one of said cooling pipes exposed from beneath, each of said connecting elements being positioned between the holding element and the respectively assigned region of the cooling pipe and being supported in a vertically adjustable matter to the holding element.

* * * * *